United States Patent
Peery

[15] 3,695,407
[45] Oct. 3, 1972

[54] FRICTIONAL TORQUE TRANSFERRING APPARATUS WITH A LIQUID MERCURY COOLING SYSTEM

[72] Inventor: Walter E. Peery, Nelson Ridge Rd., Mercer County, N.J. 08540

[22] Filed: April 23, 1970

[21] Appl. No.: 29,735

[52] U.S. Cl..........192/113 B, 192/85 CA, 192/70.28, 192/70.14, 188/264.22
[51] Int. Cl............................................F16d 13/72
[58] Field of Search..........192/113 B, 85 CA, 105 A; 188/264.22

[56] References Cited

UNITED STATES PATENTS

| 2,210,416 | 8/1940 | Kiep et al.............192/105 A |
| 3,493,087 | 2/1970 | Freeman et al.....192/113 B X |
| 3,251,442 | 5/1966 | Aschaver.............192/113 B X |
| 3,237,737 | 3/1966 | Mamo.................192/113 B X |
| 2,659,468 | 11/1953 | Hobbs..................192/113 B |
| 3,237,404 | 3/1966 | Flanigan et al.........192/113 B |
| 2,210,416 | 8/1940 | Kiep et al. ...................192/85 |
| 2,728,429 | 12/1955 | Kershner.....................192/32 |
| 3,002,595 | 10/1961 | Wier............................192/58 |

*Primary Examiner*—Benjamin W. Wyche
*Attorney*—William C. Rock

[57] ABSTRACT

A slip clutch assembly includes a plurality of alternately spaced input and output plates adapted for frictional engagement. The input plates comprise teflon surfaces with low stick friction to slip friction ratios and have formed therein central apertures and radial passageways coupled between the apertures and the peripheries of the plates. Also included are input and output shafts operatively coupled to the input and output clutch plates, respectively, and a gear pump for supplying a liquid mercury coolant centrally of the clutch assembly to the apertures formed in the input clutch plates.

7 Claims, 5 Drawing Figures

INVENTOR.
WALTER E. PEERY
his ATTORNEYS

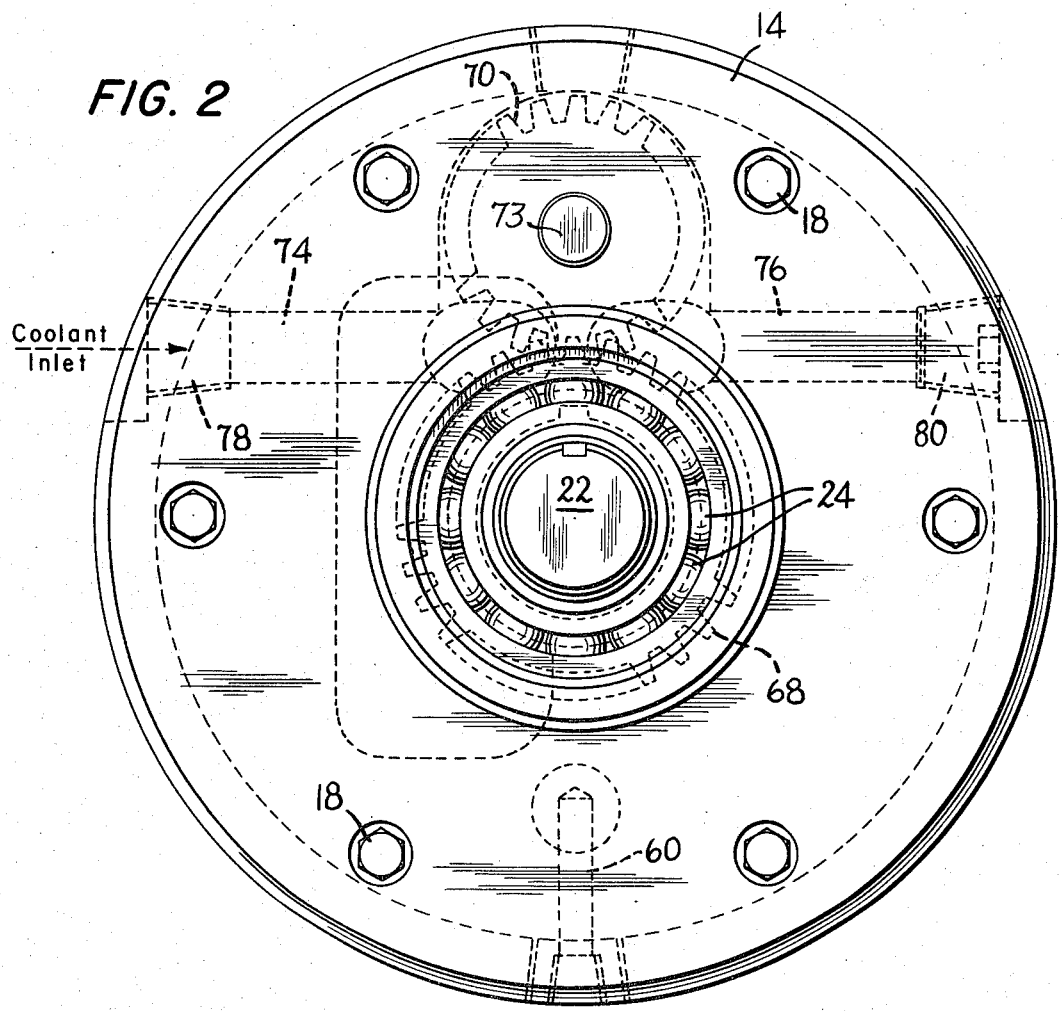
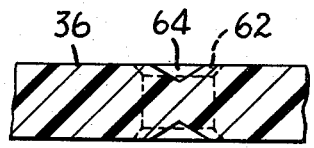
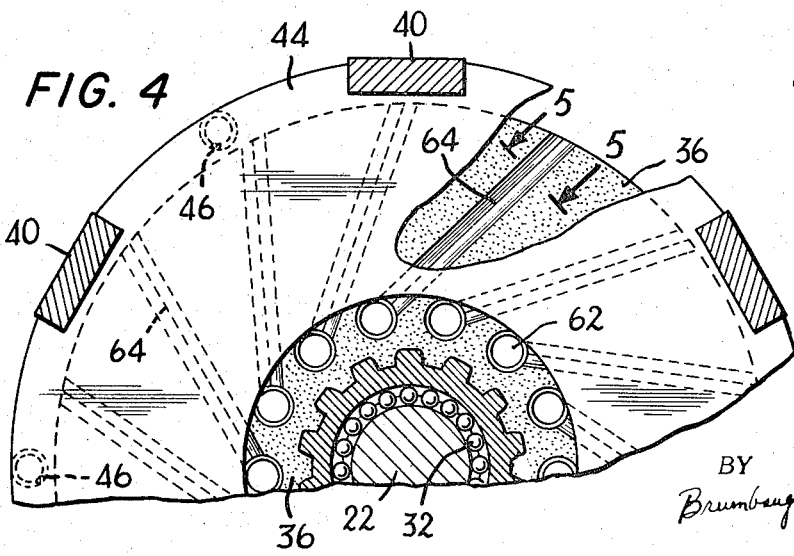
INVENTOR.
WALTER E. PEERY

FRICTIONAL TORQUE TRANSFERRING APPARATUS WITH A LIQUID MERCURY COOLING SYSTEM

BACKGROUND OF THE INVENTION

This invention relates to clutch assemblies and, more particularly, to friction clutch assemblies which require cooling during the period of slippage between the input and output clutch plates of the assembly.

As is generally understood, unless provisions are made to cool the clutch plates of a friction clutch when the plates are in engagement and there is slippage between the plates, the heat generated by the friction between the slipping plates will damage the clutch assembly.

SUMMARY OF THE INVENTION

Accordingly, it is an object of the present invention to provide a slip clutch assembly which is designed to slip constantly at high torque loads and speeds without overheating or causing damage to the friction surfaces of the clutch plates.

It is another object of the present invention to provide a slip clutch assembly which provides a low slip speed relative to the driving and driven members of the assembly without jerking and chattering.

It is a further object of the present invention to provide a slip clutch assembly wherein a unique coolant is provided to cool the clutch plates.

These and other objects of the present invention are accomplished by providing a slip clutch assembly which includes a plurality of alternately spaced driving and driven clutch plates which are adapted for frictional engagement. Predetermined plates comprise surfaces with low stick friction to slip friction ratios and have formed therein centrally disposed apertures and radial passageways coupled between the apertures and the peripheries of the plates. Also included are driving and driven members coupled to the driving and driven clutch plates, respectively, and a mercury coolant which is supplied centrally at the clutch assembly to the apertures formed in the predetermined clutch plates.

In a preferred embodiment of the invention, a gear pump is provided for circulating the mercury coolant and a pneumatically actuated plate is provided for driving the driving and driven clutch plates into frictional locking relationship.

BRIEF DESCRIPTION OF THE DRAWINGS

In the Drawings:

FIG. 2 is an end view of the illustrative slip clutch assembly taken along line 2—2 of FIG. 1 and looking in the direction of the arrows;

FIG. 4 is a fragmentary sectional view of the illustrative slip clutch assembly taken along line 4—4 of FIG. 1; and FIG. 5 is an enlarged fragmentary sectional view of a typical clutch plate taken along line 5—5 of FIG. 4 and looking in the direction of the arrows.

DESCRIPTION OF THE PREFERRED EMBODIMENT

Figure 1:
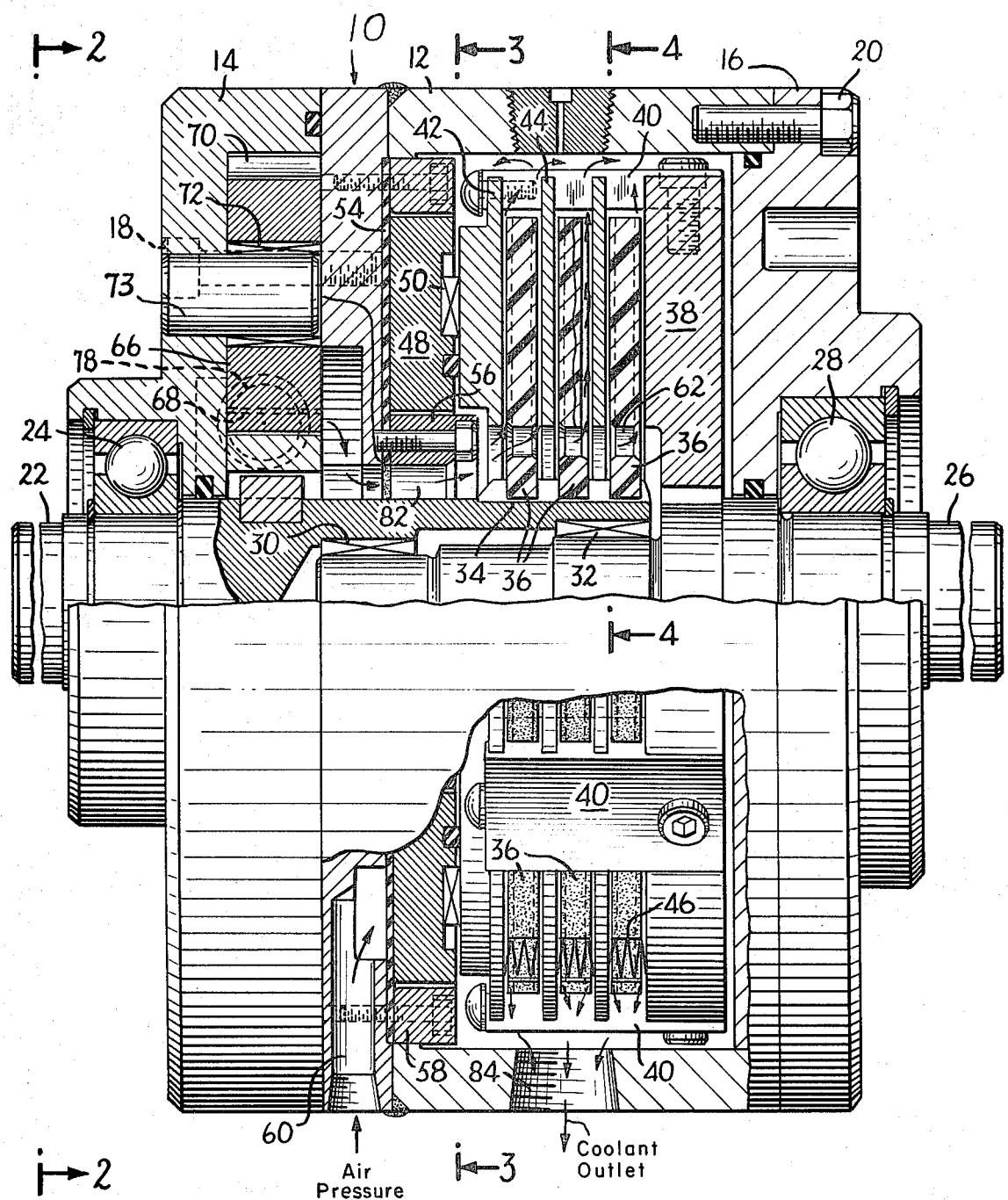
FIG. 1 is a side elevational view, partly in section and partly broken away, of an illustrative slip clutch assembly arranged according to the present invention.

In the illustrative embodiment of a slip clutch assembly arranged according to the present invention, as shown in FIGS. 1-5, there is provided a sealed housing 10 which includes a central housing member 12 and a pair of input and output end housing members 14 and 16, respectively. The end housing members 14 and 16 are secured to the central housing 12 by two pluralities of angularly spaced bolts 18 and 20, respectively.

Received in a central opening formed in the end housing member 14 is an input shaft 22, referred to hereinafter as the driving shaft. A ball bearing assembly 24 mounted in the end housing member 14 supports the shaft 22 therein and enables the shaft to rotate freely. Similarly, the end housing member 16 includes a central opening formed therein which receives an output shaft 26, hereinafter referred to as the driven shaft. A ball bearing assembly 28 mounted in the member 16 supports and enables the shaft 26 to rotate freely in the housing. As shown in FIGS. 1 and 4, two sets of internal ball bearings 30 and 32 mounted within the driving shaft 22 also operate to support and enable the driving and driven shafts 22 and 26, respectively, to rotate independently of each other.

The driving shaft 22 is splined at its right hand end 34, as viewed in FIG. 1, to enable the shaft to engage and drive the splined centers of a plurality of input clutch plates 36, hereinafter referred to as the driving clutch plates. A spider base 38 is keyed to the driven shaft 26 and has bolted to the periphery thereof a plurality of angularly spaced tangs 40. As viewed in FIGS. 1 and 4, a plurality of output clutch plates 42 and 44, hereinafter described as the driven plates, are interleaved with the driving clutch plates 36 and include notched peripheries for receiving the plurality of tangs 40. In view of the foregoing, it will be noted that the input clutch plates are continuously rotated by the driving shaft 22 and that the driven shaft 26 will be effectively coupled to the input shaft 22 whenever the driven clutch plates 42 and 44 engage the driving clutch plates 36 in a frictional locking relationship.

As shown, the driving clutch plates 36 which are splined to the input shaft 22 and the driven clutch plates 42 and 44 which are attached to the base 38 through the tangs 40 are free to move axially relative to the housing 10. In order to maintain the clutch plates 36 and 42, 44 in parallel spaced apart relation until the clutch assembly is activated, there are provided a plurality of compression spring 46 mounted in the driving clutch plates 36.

Figure 3:
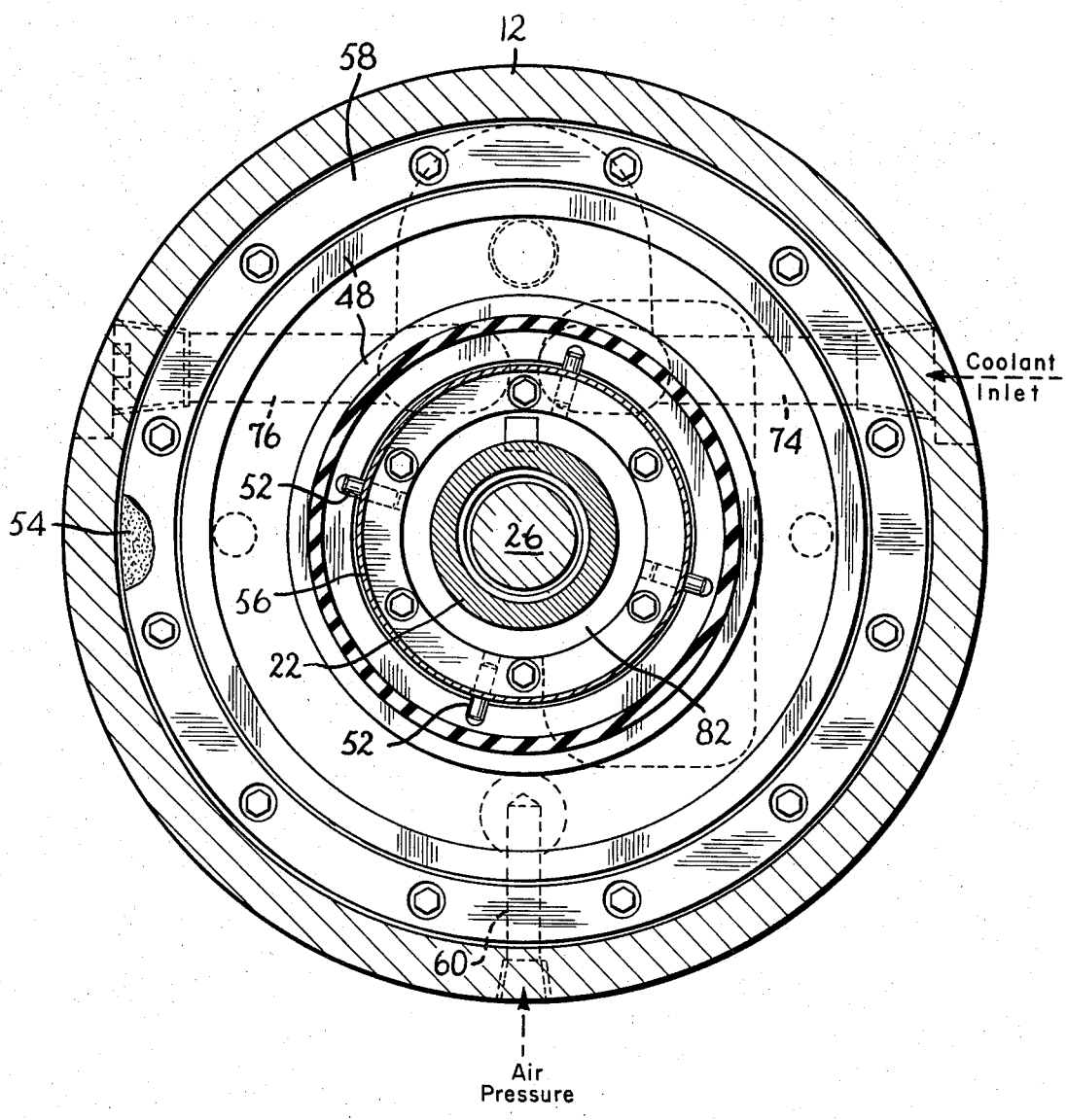
FIG. 3 is a sectional view of the illustrative clip clutch assembly taken along line 3—3 of FIG. 1.

Also provided is a pneumatically actuated plate 48 which bears against the driven clutch plate 42 through a thrust bearing 50. As best shown in FIG. 3, the plate 48 is keyed against rotation by a plurality of pins 52. A rubber diaphragm 54 is held in place against the plate 48 by means of a pair of annular inner and outer ring members 56 and 58 respectively. As viewed in FIG. 1, the left hand side of the diaphragm 54 receives air under pressure from a conduit 60 coupled to an air supply source (not shown). Upon activation of the clutch assembly, the right hand side of he diaphragm 54 bears against the plate 48 to transmit the force of the air pressure to the clutch plates 36, 42 and 44. At a selected pressure magnitude, the air pressure will overcome the compression strengths of the springs 46 to drive the plates 36 and 42, 44 into a frictional locking relationship.

To eliminate clutch chatter at low relative clutch plate velocities, each of the driving clutch plates 36 comprises a surface material having a very low ratio between its stick friction and slip friction characteristics. In a clutch mechanism the stick friction is the starting friction and the slip friction is the running friction. Teflon may be utilized as the surface material for the plates 36 although similar materials which exhibit low stick friction to slip friction ratios may be used. The driving clutch plates 36 with the Teflon surfaces may comprise two different constructions. One construction includes a solid plate of Teflon and the second construction may include a metal plate with Teflon friction pads bonded to it surfaces. Where Teflon friction pads are bonded to the surfaces of the plates, the thickness of the friction pads is in the order of about one-sixteenth inch. It will be noted that instead of the driving clutch plates 36 being provided with the Teflon friction surfaces, the driven clutch plates 42 and 44 may be provided with the Teflon friction surfaces.

As best shown in FIGS. 4 and 5, the input clutch plates 36 have formed therein a plurality of centrally disposed and angularly spaced apertures 62 through which liquid mercury coolant may flow. In addition, the opposite surfaces of the plates 36 have formed therein V-shaped radial passageways 64 which connect the apertures 62 to the peripheries of the plates 36. The provision of the passageways 64 between the apertures 62 and peripheries of the clutch plates 36 enables liquid mercury coolant, hereinafter described, to flow therein and thereby enables the clutch plates to slip constantly at high torque loads and speeds without overheating or damaging the frictional surfaces of the plates. It will be noted that in the illustrative embodiment, the driven clutch plates 42 and 44 comprise smooth friction surfaces.

As shown in FIGS. 1 and 2, mounted in the end housing member 14 is a gear pump 66 for circulating the mercury for the clutch assembly. The gear pump 66 comprises a driving gear 68 keyed to the input shaft 22 and a driven gear 70 with a sleeve bearing 72 mounted on a shaft 73. A pair of coolant inlet conduits 74 and 76 coupled between a heat exchanger (not shown) and the gear pump 66 are further provided and include a pair of threaded ports 78 and 80, respectively. Depending upon the direction of rotation by the shaft 22, either the threaded port 78 or the threaded port 80 will be plugged. For example, as viewed in FIG. 2, for a clockwise rotation by the shaft 22, port 80 will be closed and, for a counterclockwise rotation by the shaft 22, port 78 will be plugged. The outlet of the pump enters into a space 82 surrounding the input shaft 22 which allows the liquid mercury coolant to flow through the holes 62 in the clutch plates 36 and then outwardly through the radial passageways 64 to the interior of the housing 12 which performs the function of a coolant sump. The liquid mercury thereafter flows through a coolant output 84 provided at the bottom of the housing 12, through a heat exchanger (not shown) and then back to the suction ports 74 and 76 of the input housing member 14.

Applicant has discovered that the physical properties of liquid mercury prevent the mercury from being forced between the friction surfaces of the clutch plates 36, 42 and 44 at high relative velocities to break the friction contact between the clutch plates. The liquid mercury also has a capability of absorbing large quantities of heat from the clutch plates 36, 42 and 44 in a relatively short period of time to promote an effective cooling action. Further, liquid mercury as the coolant has a low viscosity which allows it to circulate easily and freely through he cooling system of the clutch, and also allows it to serve as an efficient coolant. The low viscosity of liquid mercury advantageously allows thin interface films between the mercury and the clutch materials with which the mercury is exchanging heat. The thin interface films promote an efficient exchange of heat between the liquid mercury and other surfaces.

In operation, mercury coolant collected at the bottom of the housing 12 is drawn through a heat exchanger (not shown) and through either the conduit 74 or the conduit 76 by the gear pump 66. The pump 66 then supplies the liquid mercury through the space 82 surrounding the input shaft 22 and to the clutch plates 36. The mercury coolant flows through the openings 62 formed in the clutch plates 36, through the passageways 64 and across the friction surfaces of the clutch plates 36, 42 and 44 to cool the friction surfaces. Cooling of the friction surfaces 36, 42 and 44 occurs when the plates engage but there is slippage between the plates. The mercury coolant is then collected at the bottom of the central housing member 12.

Even when the clutch assembly is activated, the mercury continues to be pumped through and along the surfaces of the clutch plates 36. Actuation of the assembly causes air under pressure to be supplied to the rubber diaphragm 54 which, in turn, transmits the force of the air pressure through the plates 48 and the thrust bearing 50 to the input clutch plates 36 and the output clutch plates 42, 44. When such time as the clutch plates engaged in frictional locking relationship, the mercury will continue to flow through the radial passageways 64. However, the liquid mercury will not be forced between the friction surfaces of the plates 36 nd 42, 44 to destroy the friction therebetween. When the input and output clutch plates are in this locking frictional relationship, the input shaft is effectively coupled to the output shaft 26 and drive the output shaft 26.

Although the invention has been described herein with reference to a specific embodiment, many modifications and variations therein will readily occur to those skilled in the art. Accordingly, all such variations and modifications are to be included within the intended scope of the present invention as defined by the following claims.

I claim:

1. Apparatus for transferring torque from a rotating driving mechanism to a driven mechanism without overheating of the apparatus or destruction of the frictional characteristics therein, and comprising:

a. a plurality of frictional plates, each plate having frictional surfaces,
   b. at least one of said plurality of frictional plates being a driving plate operatively coupled to the driving mechanism;

c. at least one of said plurality of frictional plates being a driven plate operatively coupled to the driven mechanism;

d. said plurality of frictional plates having alternatively placed driving and driven frictional plates, whereby the frictional surfaces of said driving and driven frictional plates may frictionally engage each other in a frictional contact relationship;

e. a cooling system for cooling heated frictional surfaces of at least one selected cooled frictional plate, said cooling system including liquid mercury as the coolant, said liquid mercury coolant having the desirable coolant properties of not destroying the frictional contact relationship between the frictional surfaces of said driving and driven frictional plates, having a low viscosity which allows thin interface films between the liquid mercury and other surfaces with which the mercury is exchanging heat, and having a high coefficient of thermal conductivity making it an efficient coolant;

f. said cooling system further including a centrally disposed passageway in each cooled frictional plate for supplying liquid mercury coolant to each cooled plate and cooling passageways extending from said centrally disposed passageway in each cooled plate to the periphery of each cooled plate whereby liquid mercury coolant may flow from the center to the periphery of each cooled plate while in intimate cooling relationship with the heated frictional surfaces of each cooled plate;

g. said cooling system further including means for supplying liquid mercury to said centrally disposed passageway in each cooled frictional plate whereby the liquid mercury coolant will flow along said cooling passageways to the periphery of each cooled plate; and h. said cooling system further including means for discharging heat from the heated liquid mercury coolant and away from the apparatus.

2. Apparatus as set forth in claim 1 wherein said cooling passageways in each cooled frictional plate are radially extending holes formed in the center of the thickness of each cooled frictional plate.

3. Apparatus as set forth in claim 2 wherein said apparatus is a slip clutch wherein, when said driving and driven frictional plates frictionally engage each other in said frictional contact relationship, said driving frictional plates are constantly slipping relative to said driven frictional plates when the driving mechanism is rotating, and selected frictional surfaces having a chosen stick friction to slip friction ratio to allow said constant slippage, whereby generated heat due to the constant frictional slippage between said driving and driven frictional plates must be dissipated by said cooling system.

4. Apparatus as set forth in claim 3 wherein said slip clutch includes means for forcing said frictional surfaces of the driving and driven frictional plates into said frictional contact relationship with each other at any rotational speed of the driving mechanism including and as low as zero rotational speed of the driving mechanism.

5. Apparatus as set forth in claim 1 wherein said apparatus includes means for forcing said frictional surfaces of the driving and driven frictional plates into said frictional contact relationship with each other at any rotational speed of the driving mechanism including and as low as zero rotational speed of the driving mechanism.

6. Apparatus as set forth in claim 5 wherein said apparatus is a slip clutch wherein, when said driving and driven frictional plates frictionally engage each other in said frictional contact relationship, said driving frictional plates are constantly slipping relative to said driven frictional plates when the driving mechanism is rotating, and selected frictional surfaces having a chosen stick friction to slip friction ratio to allow said constant slippage, whereby generated heat due to the constant frictional slippage between said driving and driven frictional plates must be dissipated by said cooling system.

7. Apparatus as set forth in claim 6 wherein said cooling passageways in each cooled frictional plate are radially extending holes formed in the center of the thickness of each cooled frictional plate.

* * * * *